United States Patent
Garcia

(10) Patent No.: US 11,606,945 B2
(45) Date of Patent: Mar. 21, 2023

(54) PORTABLE FISHING ROD HOLDER THAT FLOATS

(71) Applicant: Craig Garcia, Loxahatchee, FL (US)

(72) Inventor: Craig Garcia, Loxahatchee, FL (US)

( * ) Notice: Subject to any disclaimer, the term of this patent is extended or adjusted under 35 U.S.C. 154(b) by 0 days.

(21) Appl. No.: 16/826,986

(22) Filed: Mar. 23, 2020

(65) Prior Publication Data
US 2020/0296949 A1 Sep. 24, 2020

Related U.S. Application Data

(60) Provisional application No. 62/821,921, filed on Mar. 21, 2019.

(51) Int. Cl.
*A01K 97/10* (2006.01)

(52) U.S. Cl.
CPC .................................... *A01K 97/10* (2013.01)

(58) Field of Classification Search
CPC ......... A01K 97/10; A01K 97/08; A01K 97/22
USPC .............................................. 211/70.8; 43/10
See application file for complete search history.

(56) References Cited

U.S. PATENT DOCUMENTS

| | | | | |
|---|---|---|---|---|
| 2,791,255 A | * | 5/1957 | Ogden | A63B 55/10 206/315.9 |
| 2,854,147 A | * | 9/1958 | Derr | A01K 97/08 248/513 |
| 3,751,845 A | * | 8/1973 | van Leeuwen | A01K 97/05 D22/136 |
| 4,154,274 A | * | 5/1979 | Adamson | A63B 55/10 294/159 |
| 4,628,628 A | * | 12/1986 | Burgin | A01K 97/08 224/616 |
| D290,853 S | * | 7/1987 | Appel | D19/85 |
| 4,707,892 A | * | 11/1987 | Nelson | A01K 97/08 24/336 |
| 4,753,446 A | * | 6/1988 | Mills | A63B 55/00 280/DIG. 6 |
| 4,852,896 A | * | 8/1989 | Mills | A63B 55/60 280/DIG. 6 |
| 4,913,126 A | * | 4/1990 | McCall | A01K 97/01 126/204 |
| 5,040,324 A | * | 8/1991 | Rivera | A01K 97/08 224/406 |
| 5,071,048 A | * | 12/1991 | Price | A01K 97/08 224/604 |
| 5,092,463 A | * | 3/1992 | Dees | B25H 3/04 29/469 |

(Continued)

*Primary Examiner* — Yvonne R Abbott-Lewis
(74) *Attorney, Agent, or Firm* — Ingram IP Law, P.A.

(57) ABSTRACT

A portable fishing rod holder is provided with a body that is buoyant and has first and second ends. The first end is constructed of a material that deforms upon contact by an object. A plurality of apertures is provided at the first end, the plurality of apertures include a large portion and a narrow portion that is oriented toward a center point of the body. The second end includes a base dimensioned to support the body in an upright orientation. Fishing rods are inserted into the apertures and are secured by a strap that urges the fishing rods toward the center point of the body. An angler may grasp the shaft of a fishing rod to safely transport multiple fishing rods using one hand. The portable fishing rod holder avoids the hassle of tangled lines, broken tips, or broken guides that occur when transporting multiple rods using one hand.

20 Claims, 5 Drawing Sheets

(56) References Cited

U.S. PATENT DOCUMENTS

| | | | | |
|---|---|---|---|---|
| 5,137,319 A * | 8/1992 | Sauder | A01K 97/10 | 294/143 |
| 5,350,065 A * | 9/1994 | Darrey | B25H 3/00 | 220/735 |
| 5,363,870 A * | 11/1994 | Doyon | A46B 17/06 | 134/201 |
| 5,678,348 A * | 10/1997 | Zielinski | A01K 97/08 | 43/21.2 |
| 5,755,057 A * | 5/1998 | Dancer | B25H 3/026 | 206/315.11 |
| 5,775,513 A * | 7/1998 | Anthony | A63B 55/40 | 206/315.9 |
| 5,794,375 A * | 8/1998 | Wright | A01K 97/08 | 43/25 |
| 5,842,566 A * | 12/1998 | White | A47F 7/0021 | 206/362.4 |
| 5,938,049 A * | 8/1999 | Susholz | A47G 25/12 | 312/229 |
| 6,102,204 A * | 8/2000 | Castleberry | B65D 85/52 | 47/65.5 |
| 6,209,721 B1 * | 4/2001 | Sharpe | A63B 55/40 | 206/315.6 |
| 6,254,055 B1 * | 7/2001 | Lamberson, Jr. | A01K 97/10 | 206/315.11 |
| 6,364,150 B1 * | 4/2002 | Persinger | A01K 97/06 | 220/735 |
| 6,471,103 B1 * | 10/2002 | Frese | A01K 97/10 | 206/315.11 |
| 6,774,792 B1 * | 8/2004 | Williams | G08B 13/1472 | 206/315.6 |
| 6,883,268 B2 * | 4/2005 | Fraser | A01K 97/22 | 248/512 |
| 7,017,297 B1 * | 3/2006 | Ward | A01K 97/22 | 43/55 |
| 7,124,516 B2 * | 10/2006 | Shiraishi | G06Q 30/0236 | 34/103 |
| 7,150,123 B1 * | 12/2006 | Fox | A01K 97/06 | 43/54.1 |
| 7,156,242 B2 * | 1/2007 | Lin | B25H 3/04 | 211/70.6 |
| D566,770 S * | 4/2008 | Cetera | D19/77 | |
| 7,549,697 B1 * | 6/2009 | Long | A01K 97/20 | 43/56 |
| 7,594,353 B2 * | 9/2009 | Lucky | A01K 97/10 | 248/512 |
| D612,904 S * | 3/2010 | Alley | D22/147 | |
| 7,676,983 B2 * | 3/2010 | Jenkins | A01K 97/08 | 248/512 |
| 8,783,748 B1 * | 7/2014 | Quinn | A01K 97/08 | 294/159 |
| 8,801,064 B2 * | 8/2014 | Xiques | A01K 97/08 | 294/143 |
| 9,137,981 B1 * | 9/2015 | Groves, Jr. | A01K 97/08 | |
| 9,848,723 B1 * | 12/2017 | Huang | A46B 17/08 | |
| D881,600 S * | 4/2020 | Jacobs | D6/552 | |
| D890,458 S * | 7/2020 | Yearwood, Jr. | D32/53 | |
| 11,026,412 B1 * | 6/2021 | Diaz | A01K 97/10 | |
| 2002/0178642 A1 * | 12/2002 | Garcia | A01K 97/08 | 43/26 |
| 2004/0237378 A1 * | 12/2004 | Fraser | A01K 97/22 | 43/54.1 |
| 2005/0255765 A1 * | 11/2005 | Frese | A01K 97/08 | 441/136 |
| 2005/0257417 A1 * | 11/2005 | Black | A01K 97/08 | 43/21.2 |
| 2006/0207161 A1 * | 9/2006 | Lynn | A01K 97/08 | 224/922 |
| 2006/0277814 A1 * | 12/2006 | Lucky | A01K 97/10 | 43/21.2 |
| 2007/0039231 A1 * | 2/2007 | Jenkins | A01K 97/06 | 43/21.2 |
| 2013/0227875 A1 * | 9/2013 | DeSpiegelaere | A01K 97/08 | 43/54.1 |
| 2014/0125075 A1 * | 5/2014 | Xiques | A01K 97/08 | 294/143 |
| 2014/0331543 A1 * | 11/2014 | Hancock | A01K 97/01 | 43/17 |
| 2015/0201601 A1 * | 7/2015 | Honermann | A01K 97/01 | 211/13.1 |
| 2016/0374323 A1 * | 12/2016 | Bernardini | A01K 97/08 | 224/257 |
| 2019/0223424 A1 * | 7/2019 | Moses | A47F 7/0035 | |
| 2020/0085027 A1 * | 3/2020 | Crawford | A01K 97/08 | |
| 2020/0296949 A1 * | 9/2020 | Garcia | A01K 97/10 | |

* cited by examiner

PORTABLE FISHING ROD HOLDER THAT FLOATS

CROSS-REFERENCE TO RELATED APPLICATIONS

This application claims priority to U.S. Provisional Application 62/821,921, filed on Mar. 21, 2019, the complete disclosure of which is incorporated herein by reference in its entirety.

FIELD OF THE TECHNOLOGY

The technology relates to fishing accessories and, more particularly, to a portable fishing rod holder that floats.

BACKGROUND OF THE TECHNOLOGY

Typically, anglers prepare fishing gear ahead of time that includes selecting appropriate fishing rods and reels for the prevailing conditions, along with attaching desired leaders to main fishing lines and selecting desired hooks, lures, weights, or the like. Furthermore, anglers generally prepare multiple fishing rods to maximize fishing time and to ensure the fishing gear is ready for immediate use upon arrival at a fishing destination. However, transporting multiple fishing rods that include lines and hooks is a challenge.

For starters, fishing rod lengths alone make them difficult to transport and the addition of reels, lines, hooks, lures, and weights, or the like makes transportation more difficult. Typically, fishing rods are six feet or greater in length. The additional elements skew weight distribution along the length of the fishing rod. To complicate matters, anglers typically carry two or more fishing rods in a single hand so they can carry tackle and live bait containers in the other hand. Anglers commonly grab the shafts of multiple rods with a single hand, which forces the rods to rub against each other. This contact may damage fishing rod elements including ceramic rings, guides, rollers, tips, and reels. Furthermore, the contact may cause the lines, hooks, and weights of two or more fishing rods to tangle. Other drawbacks exist.

BRIEF DESCRIPTION OF THE DRAWINGS

The accompanying drawings are incorporated in and constitute a part of this specification. They illustrate several examples of the technology and, together with the description, serve to explain the principles of the technology.

DETAILED DESCRIPTION OF THE TECHNOLOGY

Figure 1:
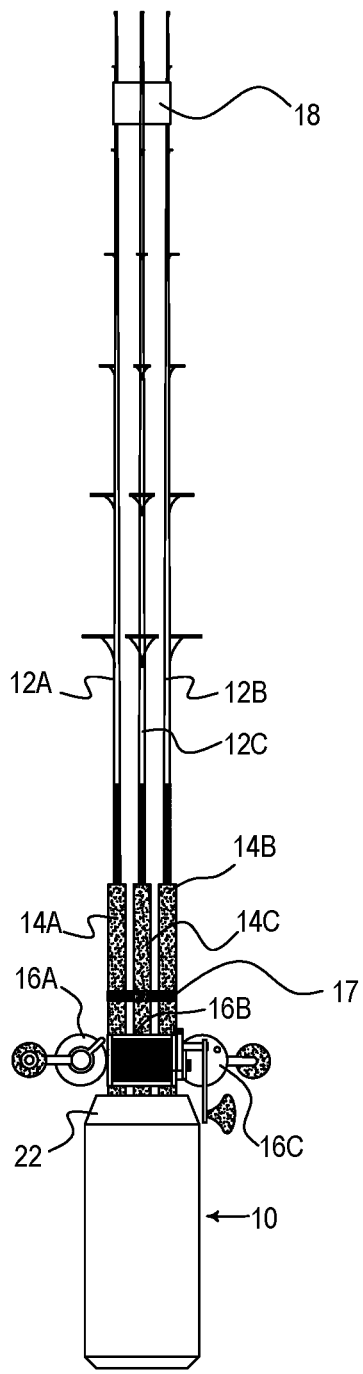
FIG. 1 illustrates a side view of a portable fishing rod holder in use according to one example of the technology.

The technology employs a portable fishing rod holder that overcomes the deficiencies of existing fishing rod holders. According to one example, the portable fishing rod holder allows anglers to easily transport multiple fishing rods between locations and to safely store multiple fishing rods when not in use. This description includes specific details that are set forth to provide a thorough understanding of the examples described herein. It will be understood by those of ordinary skill in the art that the examples described herein can be practiced without these specific details. In other instances, components have not been described in detail so as not to obscure the related relevant feature being described. Also, the description is not to be considered as limiting the scope of the examples described herein. The drawings are not necessarily to scale and proportions of certain parts may have been exaggerated to better illustrate details and features of the present technology. Those skilled in the art with access to the teachings provided herein will recognize additional modifications, applications, and examples within the scope thereof and additional fields in which the technology may be of significant utility. It will be appreciated that for simplicity and clarity of illustration, where appropriate, reference numerals may be repeated among the different figures to indicate corresponding or analogous elements.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and means either, any, several, or all of the listed items. The terms "comprising," "including" and "having" are used interchangeably in this disclosure. The terms "comprising," "including" and "having" mean to include, but not necessarily be limited to the things so described.

The terms "connected" and "coupled" are not restricted to physical or mechanical connections or couplings. The connection can be such that the objects are permanently connected or releasably connected. The term "communicatively coupled" is defined as connected, either directly or indirectly through intervening components. The term "substantially" is defined to be essentially conforming to the thing that it "substantially" modifies, such that the thing need not be exact.

The technology provides a portable fishing rod holder having a buoyant body that includes first and second ends. The first end is constructed of a material that deforms when fishing rod handles are inserted in a plurality of apertures provided at the first end. According to one example, the plurality of apertures include a large portion and a narrow portion that is oriented toward a center point of the body. The portable fishing rod holder includes a base at the second end that is dimensioned to support the body in an upright orientation when placed on a surface such as a floor. According to one example, an interior of the body may be substantially hollow to receive a handle of a fishing rod therein.

FIG. 1 illustrates a portable fishing rod holder 10 that houses fishing rods 12a-12c according to one example of the technology. According to one example, the fishing rods 12a-12c may include corresponding handles 14a-14c that may be inserted into apertures provided at a top surface 15 of the portable fishing rod holder 10. When positioned in the portable fishing rod holder 10, the fishing rods 12a-12c are oriented with the handles 14a-14c downward and the fishing rod tips upward. According to one example, the portable fishing rod holder 10 may be paired with a spacer 18 provided proximate the fishing rods tips. According to one example, the spacer 18 maintains tip separation and may provide additional rigidity when carrying the fishing rods 12a-12c in the portable fishing rod holder 10. According to one example, the spacer 18 may be constructed from a deformable material such as foam, plastic, or the like. According to one example, the spacer 18 may be buoyant. While FIG. 1 illustrates the portable fishing rod holder 10 with a generally cylindrical body, one of ordinary skill in the art will readily appreciate that the body may include any shape such as square, octagonal, or the like.

Figure 2:
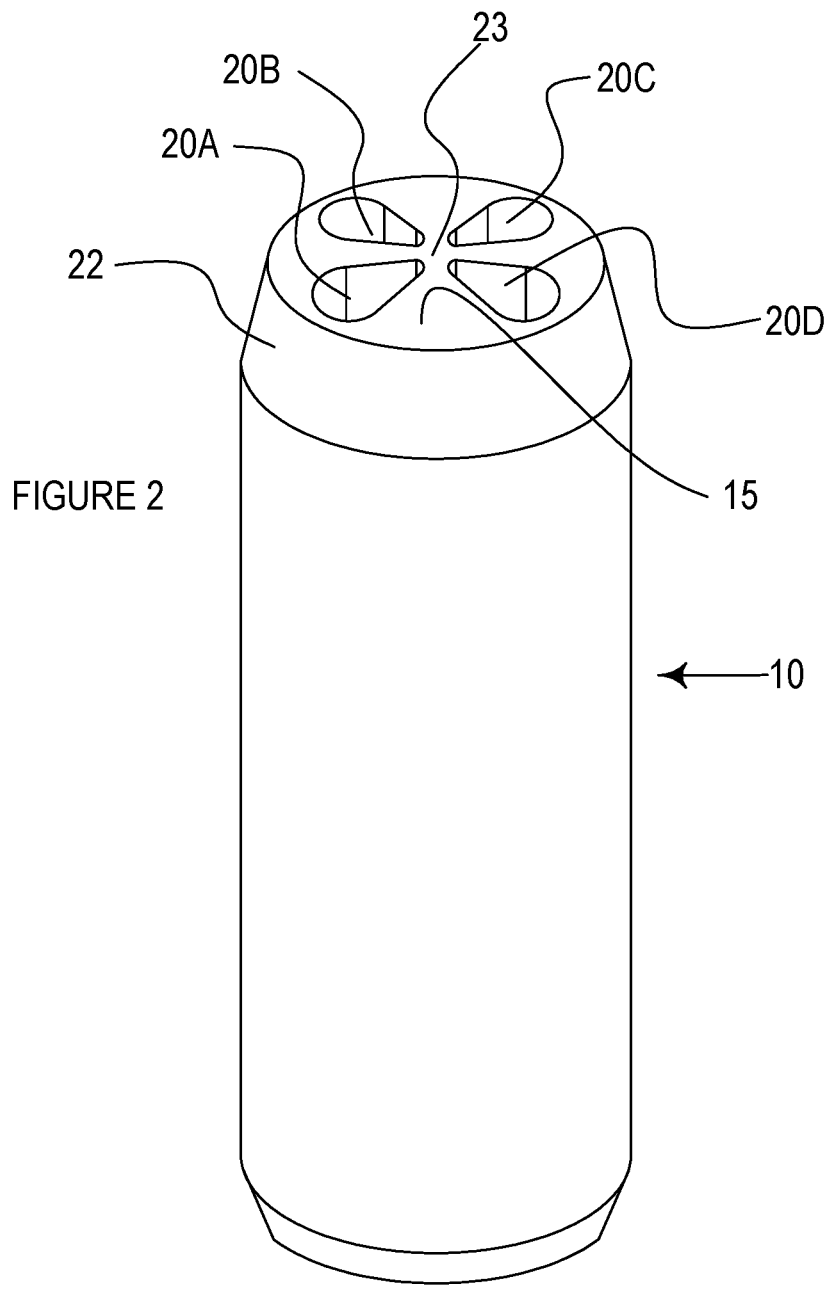
FIG. 2 illustrates a perspective view of the portable fishing rod holder according to one example of the technology.

FIG. 2 illustrates a perspective view of the portable fishing rod holder 10 according to one example of the technology. The top surface 15 of the portable fishing rod holder 10 may include a plurality of apertures 20a-20d. According to one example, the apertures 20a-20d may be dimensioned or sized to frictionally engage handles 14a-14c of the fishing rods 12a-12c. According to one example, the apertures 20a-20d may include different dimensions to receive different sized handles. For example, some apertures may include smaller dimension to receive smaller handle diameters, while other apertures may include larger dimensions to receive larger handle diameters. According to one example, the portable fishing rod holder 10 may be configured to receive different fishing rod sizes. According to one example, the apertures 20a-20d may include a tear drop shape. However, one of ordinary skill in the art will readily appreciate that the apertures 20a-20d may be constructed of any shape. According to one example, the apertures 20a-20d may be contoured to accommodate protrusions or contours provided on the fishing rod handles 14a-14c. Furthermore, one of ordinary skill in the art will readily appreciate that each aperture 20a-20d may be constructed of a custom size to accommodate particular handle sizes. Still further, while four apertures are illustrated, one of ordinary skill in the art will readily appreciate that any number of apertures may be employed depending on, for example, a physical size of the portable fishing rod holder 10 and/or the physical size of fishing rods 12a-12c to be transported.

With reference to FIG. 1, the fishing rods handles 14a-14c may be inserted into the corresponding apertures 20a-20c such that reels 16a-16c are positioned above the top surface 15 of the portable fishing rod holder 10. According to one example, a strap 17 may be provided to secure the plurality of handles 14a-14c together within the portable fishing rod holder 10. According to one example, the strap 17 may include a hook and loop fastener, a bulk strap fastener, a slip lock fastener, or the like. According to one example, the strap 17 may tightened around the handles 14a-14c to pull the handles 14a-14c toward a center point 23 of the portable fishing rod holder 10. According to one example, as the handles 14a-14c may be drawn toward the center point 23 of the portable fishing rod holder 10 to frictionally engage the narrower portion of the tear drop shaped apertures 20a-20d. Accord to one example, if the handles 14a-14c have a smaller diameter than a diameter of the larger portion of the tear drop shaped apertures 20a-20d, then tightening the strap 17 will draw the handles 14a-14c toward the center point 23 to frictionally engage the narrower portion of the tear drop shaped apertures 20a-20d. With reference to FIG. 1, the spacer 18 may be provided proximate the tips of the fishing rods 12a-12c to maintain tip separation as the handles 14a-14c are brought closer together.

According to another example, an upper portion 22 of the portable fishing rod holder 10 may be constructed of a deformable material that expands or contracts to frictionally engage the handles 14a-14c provided therein. For example, the deformable material may include foam, memory foam, plastic, or the like. According to one example, if the diameter of the apertures 20a-20d are smaller than the diameter of the handles 14a-14c, the deformable material my expand to frictionally accept the handles 14a-14c therein. According to yet another example, the apertures 20a-20d may include a lining attached therein that frictionally engages the handles 14a-14c when inserted therein. For example, the lining may include an elastic or rubber material that is coupled to an inner circumference of the apertures to taper the diameter of the apertures 20a-20d. According to one example, if the handles 14a-14c have a smaller diameter than the diameter of the apertures 20a-20d, the lining may frictionally engage the handles 14a-14c to physically maintain the fishing rods 12a-12c within the apertures 20a-20d. According to one example, the lining may be provided so that the portable fishing rod holder 10 may be manufactured to include a single sized aperture with an adjustable diameter to accommodate a range of handle sizes.

According to one example, the portable fishing rod holder 10 allows anglers to twist the fishing rod handles 14a-14c clockwise or counter-clockwise within the apertures 20a-20d. For example, anglers may twist the fishing rod handles 14a-14c within the apertures 20a-20d to prevent contact of adjacent fishing rod components during transportation including ceramic rings, guides, rollers, tips, and reels. According to one example, the strap 17 may be tightened to frictionally engage the plurality of fishing rods against a sidewall of the apertures 20a-20d, thereby allowing anglers to grip one of the plurality of fishing rods to transport the plurality of fishing rods. According to one example, anglers may grip any of the plurality of fishing rods to transport the portable fishing rod holder 10 that holds plurality of fishing rods. According to one example, the fishing rod shafts are sufficiently long to allow anglers of different heights to carry the plurality of fishing rods 12a-12c in a diagonal orientation for increased comfortable and maneuverability. For example, anglers that are five (5) feet in height may grip the shaft closer to the portable fishing rod holder 10, while anglers that are seven (7) feet in height may grip the shaft farther from the portable fishing rod holder 10. According to one example, the technology allows anglers to customize a height for transporting the plurality of fishing rods, depending on the circumstances. For example, anglers entering a confined space such as the underside of a bridge may grip the shaft farther from the portable fishing rod holder 10 to lower the fishing rod tips closer to the ground, while anglers traveling in open areas may grip the shaft closer to the portable fishing rod holder 10 to increase an overall height of the fishing rods above the ground. Accordingly, the portable fishing rod holder 10 allows anglers to safely and securely transport a plurality of fishing rods using a single hand. According to one example, anglers may frequently self-adjust a grip height on the shaft while transporting the fishing rods to adjust an angle that the fishing rods extend in front of them. This angle adjustment feature enhances maneuverability and protection of the fishing rods during transportation.

According to one example, the portable fishing rod holder 10 may include a shoulder strap to facilitate carrying. According to one example, one end of the shoulder strap may be anchored to the portable fishing rod holder 10 and a second end of the shoulder strap may be anchored along a shaft of the one or more fishing rods 12a-12c. For example, an anchor strap may be secured to the shafts of one or more fishing rods 12a-12c. According to one example, the anchor strap may include a D-ring. According to one example, the second end of the shoulder strap may be clipped to the D-ring of the anchor strap. According to another example, the first and second ends of the shoulder strap may be anchored to the portable fishing rod holder 10. Still further, the first and second ends of the shoulder strap may be anchored to anchor straps provided along shafts of one or more fishing rods 12a-12c.

Figure 3:
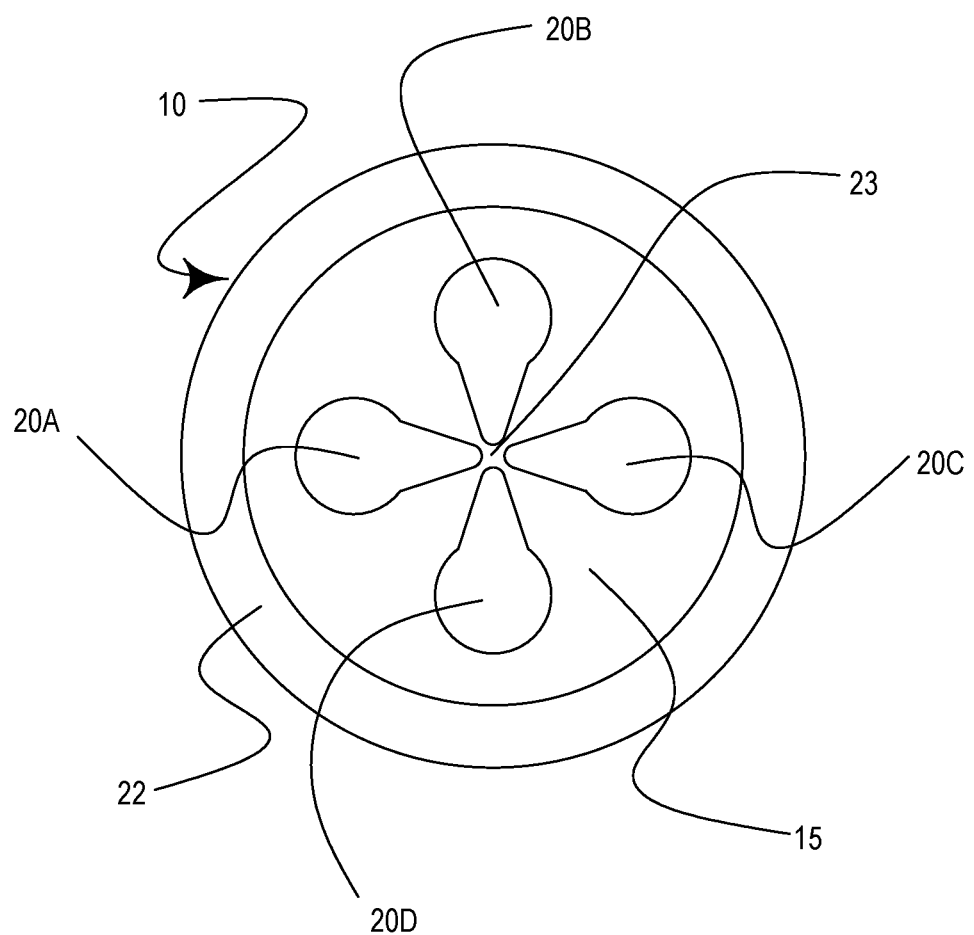
FIG. 3 illustrates a top view of the portable fishing rod holder shown in FIG. 2.

FIG. 3 illustrates a top view of the portable fishing rod holder 10 according to one example of the technology. According to one example, the top surface 15 of the portable fishing rod holder 10 may include a plurality of tear drop shaped apertures 20a-20d. According to one example, the larger portion of the tear drop shaped apertures 20a-20d may be located proximate to an outer periphery of the portable fishing rod holder 10 and may measure from 1 to 3 inches in diameter. According to one example, the smaller portion of the tear drop shaped apertures 20a-20d may be located proximate to the center point 23 and may measure from a ¼ to ½ inch in diameter. According to one example, the tear drop shaped apertures 20a-20d may taper from the larger portion to the smaller portion. One of ordinary skill in the art will readily appreciate that the size and shape of the apertures 20a-20d may vary depending on the application. For example, aperture sizes may be larger for deep sea fishing rods and smaller for freshwater fishing rods.

Figure 4:
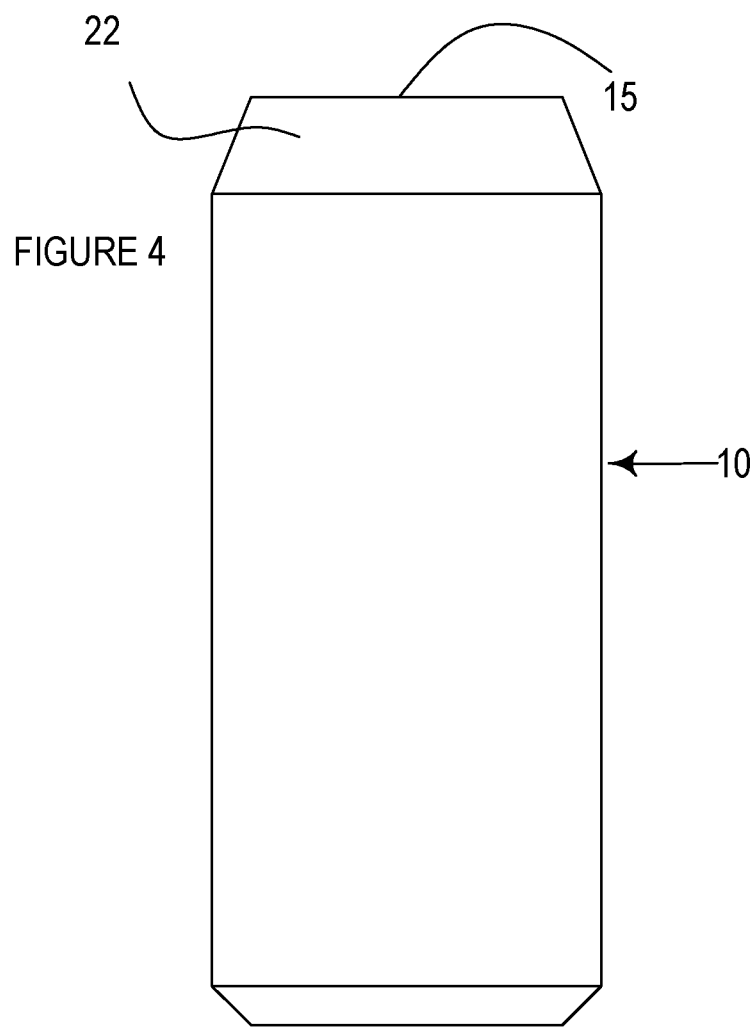
FIG. 4 illustrates a side view of the portable fishing rod holder shown in FIG. 2.
Figure 5:
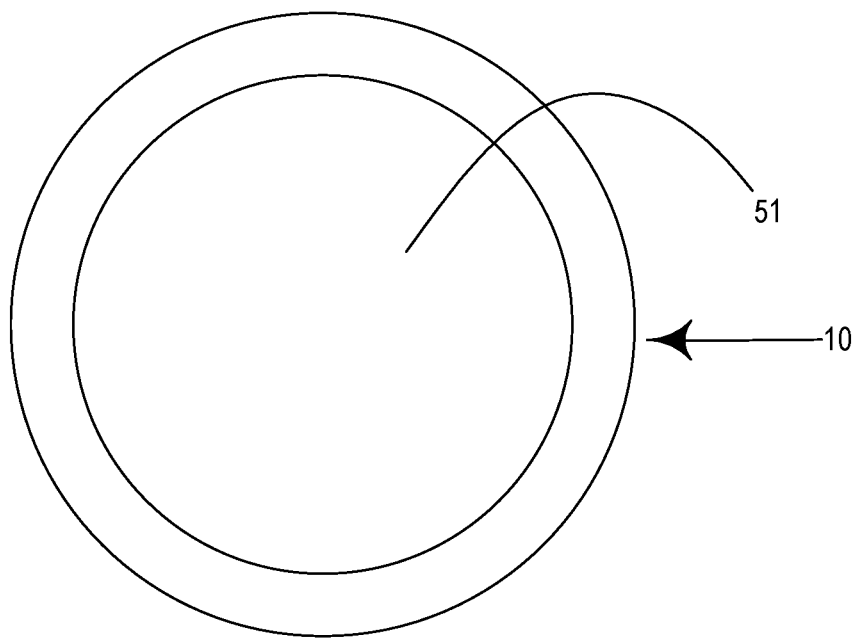
FIG. 5 illustrates a bottom view of the portable fishing rod holder shown in FIG. 2.

FIG. 4 illustrates a side view of the portable fishing rod holder 10 according to one example of the technology. According to one example, a height of the portable fishing rod holder 10 may be between 1 to 1.5 feet, and preferably 1 foot 4 inches. According to one example, the portable fishing rod holder 10 may receive a fishing rod handle 14a-c to a depth of over 1 foot in length. According to one example, a diameter of the portable fishing rod holder 10 may be between 6 to 9 inches, preferably 6¹¹⁄₁₆ inches. According to one example, a diameter of the portable fishing rod holder 10 may be configured such that the portable fishing rod holder 10 remains upright when loaded with a plurality of fishing poles and placed on an underlying surface. For example, the portable fishing rod holder 10 may be manufactured with a larger diameter to remain upright when loaded with larger deep-sea fishing rods and placed on an underlying surface. Alternatively, the portable fishing rod holder 10 may be manufactured with a smaller diameter to remain upright when loaded with smaller freshwater fishing rods and placed on an underlying surface. Still further, the portable fishing rod holder 10 may be manufactured with a medium-sized diameter to remain upright when loaded with a combination of larger deep-sea fishing rods and smaller freshwater fishing rods and placed on an underlying surface. According to one example, a diameter of the top surface 15 of the portable fishing rod holder 10 may be between 5 to 7 inches, and preferably 5⅜ inches. According to one example, the tapered portion 22 proximate to the top surface 15 of the portable fishing rod holder 10 may be designed to frictionally engage the fishing rods 12a-c. In contrast, the portion of the portable fishing rod holder 10 provided below the tapered portion 22 may be designed to loosely engage or not physically contact the fishing rods 12a-c. FIG. 5 illustrates a bottom view of the portable fishing rod holder 10 according to one example of the technology. According to one example, the bottom surface 51 may be dimensioned such that the portable fishing rod holder 10 remains upright when loaded with a plurality of fishing poles and placed on an underlying surface.

According to one example, the portable fishing rod holder 10 is configured to remain in an upright position when placed on an underlying surface. For example, anglers may place the portable fishing rod holder 10 in an upright position upon return from a fishing excursion when fully loaded with fishing rods. According to one example, the fishing rods may be stored with tips up and handles down. The portable fishing rod holder 10 may be constructed of water-resistant or waterproof materials such as plastic or foam. Accordingly, anglers may wash down the fishing rods while stored in the portable fishing rod holder 10. The concept is that the fishing rods may remain safely stored in the portable fishing rod holder 10 when not in use. Furthermore, anglers may prepare the fishing rods for the next use while stored in the portable fishing rod holder 10 including tying knots, attaching leaders to main fishing lines, or attaching desired hooks, lures, weights, or the like. According to one example, the portable fishing rod holder 10 allows anglers to safely transport multiple fishing rods using one hand. The technology described herein minimizes the hassle of tangled lines, broken tips, broken guides, or the like that occur when transporting multiple fishing rods. Furthermore, the portable fishing rod holder 10 safely stores fishing rods and reels when not in use.

According to one example, the portable fishing rod holder 10 may be made from foam, plastic, or other suitable materials that allow the device to float when placed in water. According to one example, the material properties allow the portable fishing rod holder 10 to be buoyant or float when placed in water fully loaded with fishing rods. Furthermore, the material properties allow the portable fishing rod holder 10 to be buoyant or float when placed in water and grasped by a person. Accordingly, the portable fishing rod holder 10 may be used as a personal flotation device during emergency situations such as when a boat or vessel capsizes. According to one example, the portable fishing rod holder 10 may include safety devices such as a strobe light, an emergency position indicating radio beacon ("EPIRB"), a whistle, or the like.

While the foregoing illustrates and describes examples of this technology, it is to be understood that the technology is not limited to the constructions disclosed herein. The technology may be embodied in other specific forms without departing from its spirit. Accordingly, the appended claims are not limited by specific examples described herein.

What is claimed is:

1. A portable fishing rod holder, comprising:
    a body that is buoyant and has first and second ends that are non-separable, the first end being constructed of a material that deforms upon contact by an object;
    a plurality of apertures provided at the first end to extend radially from a center point, the plurality of apertures having a large portion located distal from the center point and a narrow portion located proximal to the center point, the plurality of apertures being coplanar; and
    a base provided at the second end, the base being dimensioned to support the body in an upright orientation.

2. The portable fishing rod holder according to claim 1, wherein the material expands upon contact.

3. The portable fishing rod holder according to claim 1, wherein an interior of the body is substantially hollow.

4. The portable fishing rod holder according to claim 1, further comprising a strap that urges objects within the plurality of apertures toward the narrow portion proximate to the center point.

5. The portable fishing rod holder according to claim 1, further comprising a lining provided within the plurality of apertures.

6. The portable fishing rod holder according to claim 5, wherein the lining frictionally engages objects provided within the plurality of apertures.

7. The portable fishing rod holder according to claim 1, wherein the body is between 1 to 1.5 feet in length.

8. The portable fishing rod holder according to claim 1, wherein the body is between 6 to 9 inches in diameter.

9. The portable fishing rod holder according to claim 1, wherein the body includes a substantially cylindrical shape.

10. The portable fishing rod holder according to claim 1, wherein the plurality of apertures are different sizes.

11. A portable fishing rod holder, comprising:
a body that is buoyant and has first and second ends that are non-separable, the body being between 1 to 1.5 feet in length, the first end being constructed of a material that deforms upon contact by an object;
a plurality of apertures provided at the first end to extend radially from a center point, the plurality of apertures having a large portion located distal from the center point and a narrow portion located proximal to the center point, the plurality of apertures being coplanar; and
a base provided at the second end, the base being dimensioned to support the body in an upright orientation.

12. The portable fishing rod holder according to claim 11, wherein the material expands upon contact.

13. The portable fishing rod holder according to claim 11, wherein an interior of the body is substantially hollow.

14. The portable fishing rod holder according to claim 11, further comprising a strap that urges objects within the plurality of apertures toward the narrow portion proximate to the center point.

15. The portable fishing rod holder according to claim 11, further comprising a lining provided within the plurality of apertures.

16. The portable fishing rod holder according to claim 15, wherein the lining frictionally engages objects provided within the plurality of apertures.

17. The portable fishing rod holder according to claim 11, wherein the body is made from foam or plastic material.

18. The portable fishing rod holder according to claim 11, wherein the body is between 6 to 9 inches in diameter.

19. The portable fishing rod holder according to claim 11, wherein the body is a substantially cylindrical shape.

20. The portable fishing rod holder according to claim 11, wherein the plurality of apertures are different sizes.

\* \* \* \* \*